Jan. 10, 1961 W. A. BLACK ET AL 2,967,715

MINIATURE RECORDING DEVICE

Filed April 19, 1955 3 Sheets-Sheet 1

Inventors
WILLIAM A. BLACK
JOHN S. MILLARD

H. H. Hulse
Attorney

MINIATURE RECORDING DEVICE

Filed April 19, 1955 3 Sheets-Sheet 2

Inventors
WILLIAM A. BLACK
JOHN S. MILLARD

H. H. Hulse
Attorney

Jan. 10, 1961 W. A. BLACK ET AL 2,967,715

MINIATURE RECORDING DEVICE

Filed April 19, 1955 3 Sheets-Sheet 3

Inventors
WILLIAM A. BLACK
JOHN S. MILLARD

H. H. Hulse
Attorney 2,967,715

MINIATURE RECORDING DEVICE

William A. Black, Montclair, N.J., and John S. Millard, Whittier, Calif., assignors to General Time Corporation, New York, N.Y., a corporation of Delaware Filed Apr. 19, 1955, Ser. No. 502,429
9 Claims. (Cl. 274—9)

The present invention relates to recording devices and more particularly to a miniature recorder intended for portable use.

It is an object of the present invention to provide a miniature recording device in which the driving mechanism has only limited torque but which is nevertheless characterized by rapid, positive and consistent starting, freedom from "wow" under running conditions, as well as a rapid and positive stop when the recording is completed. It is a more specific object of the present invention to provide a miniature recording device which is capable of producing a smooth and consistent recording of dictation or other material which may be recorded in short, disconnected fashion. In general, it is the purpose of the present invention to provide a miniature recorder which is capable of both recording and playback and which possesses features usually found in much larger and more powerful devices.

It is a further object, contributing to convenience, to provide a recorder which is not only small in size but light in weight, making it possible to carry the entire device in the pocket of the user and enabling it to be readily clasped in the palm of the hand under recording conditions.

It is still another object to provide a miniature recorder which is reliable in spite of the shock and vibration to which a hand held device is normally subject, which employs a grooved record, and a freely-centered stylus which is removed from the groove whenever the "record" control is moved to the "off" position. It is another object to provide a miniature recorder having a grooved record and a disengageable stylus and which insures that the stylus is returned to the same groove position upon each resumption of recording. It is a still further object to provide a device of the above type having a positively indexed tone arm but in which the stylus is nevertheless free to assume a precisely centered equilibrium position in the record groove and in spite of eccentricity and minor departures in the spacing of the grooves, making it possible to employ inexpensive non-precision records.

It is another object of the present invention to provide a miniature recording device which is convenient to use and which has an accurate visible index of tone arm position and playing time. It is a more specific object to provide a miniature recorder having a spring driving mechanism and in which the spring is rewound automatically as an incident to indexing in the tone arm back to the "start" position.

Finally, it is an object to provide a miniature recorder which has a novel, extremely compact arrangement of mechanism but which is nevertheless simple and inexpensive.

Other objects and advantages of the invention will become apparent upon reading the attached detailed description and upon reference to the drawings in which.

While the invention has been described in connection with a preferred embodiment, it will be understood that we do not intend to limit the invention to such embodiment, but intend to cover all modifications and alternative constructions which are included within the spirit and scope of the appended claims.

Figures 1, 2, 3, 4:
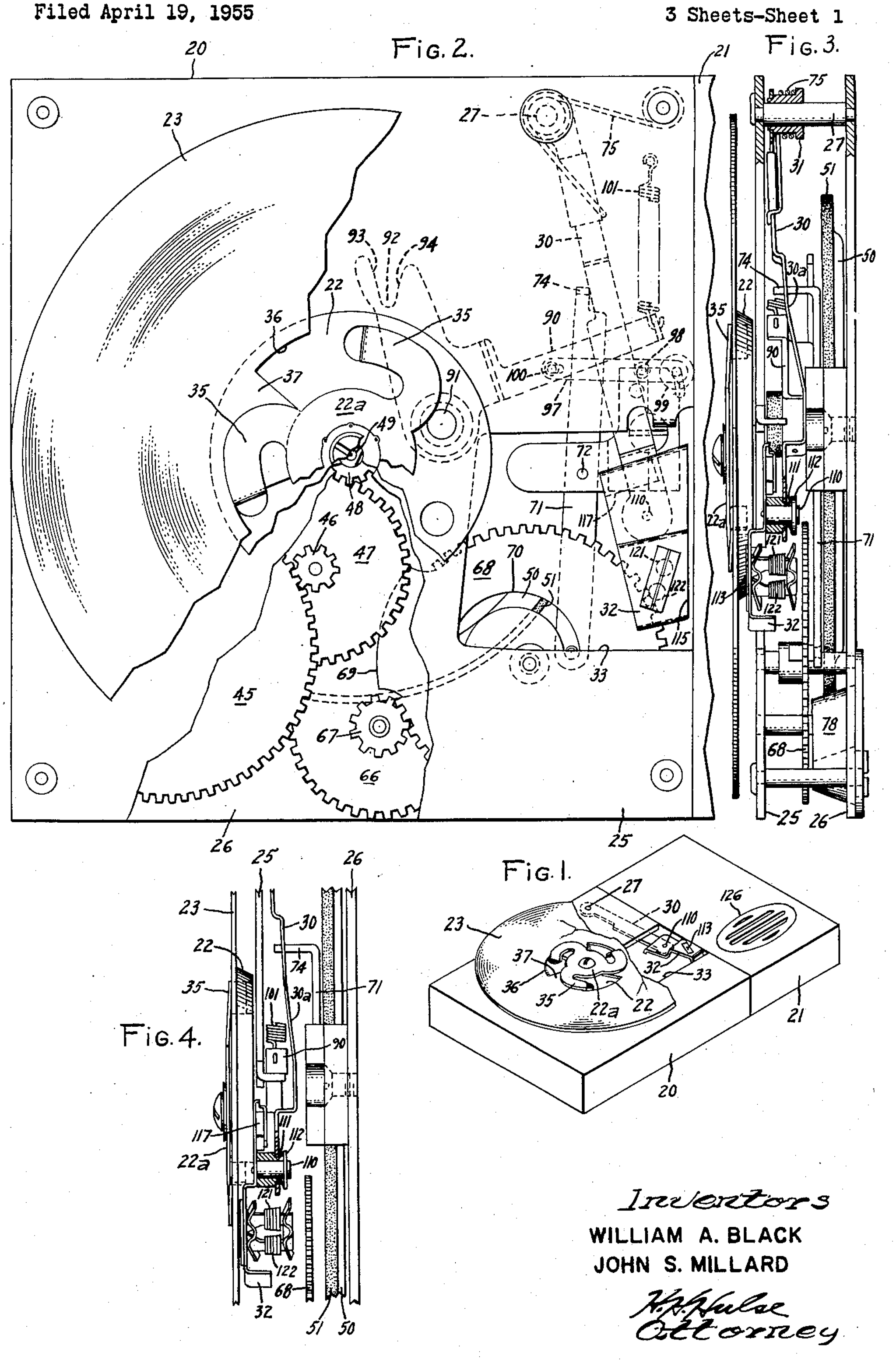
Figure 1 is a perspective, on reduced scale, of a recorder constructed in accordance with the present invention.
Fig. 2 is a front view of the recorder with the record and a portion of the casing and mechanism broken away.
Fig. 3 is a right hand end view of the device shown in Fig. 2 with the tone arm cammed into retracted position.
Fig. 4 is a fragmentary view similar to Fig. 2 but showing the tone arm moved into contact with the record.

Turning now to the drawings, Figure 1 shows the general appearance of the present recorder. It consists of a mechanical portion 20 toward which the present application is particularly directed and an electrical or amplifier portion 21. With regard to the amplifier portion 21, it will suffice to say that the circuitry and construction is of the hearing aid type, employing miniature tubes or transistors together with a suitable battery power supply for energizing the same. In the embodiment to be described, the recording element is driven by spring mechanism and extremely low power batteries may therefore be used which are sufficient to handle the amplifier circuits.

Extending upwardly at the face of the recorder is a record post 22 mounting a grooved record 23. For the purpose of supporting and protecting the driving mechanism a frame is provided having a front plate 25 and a rear plate 26 separated by suitable posts and spacers. Pivoted to a post 27 is a tone arm 30 having a mounting bushing 31 and a pick-up recording head 32, the latter being referred to also as a transducer head. The front frame plate 25 is formed with a rectangular aperture 33 so that the recording and pickup head 32 may engage the full width of track on the underside of the record 23.

In order to keep the record 23 on the record post 22 in spite of the pressure exerted by the head 32, the record post is provided with a mounting plate 22*a* having three overhanging spring clips 35 which extend radially outward and which register with section-shaped openings 36 at the center of the record. Prior to recording, the record is positioned in the mounting plate and given a partial turn in a direction opposite to the driving direction. The spring clips 35 then overlie the fingers 37 between the openings 36, holding the record in seated position until intentionally removed.

In carrying out the present invention, the record post 22 is rotatable by means of a manually wound coil spring and driving train. Referring to the drawings and particularly to the simplified perspective view shown in Fig. 7, a spiral spring 40, anchored to the frame at 40*a* and arranged about a winding stem 41, is wound by a key 42 which projects outwardly from the back plate. The winding stem 41 is coupled to the driving train by means of a ratchet wheel 43 and a pawl 44, the pawl being pivotally mounted on a spring output gear 45. Engaging the gear 45 is a pinion 46 closely coupled to a gear 47 which in turn engages a pinion 48 on an output shaft 49. Mounted at the outer end of the output shaft 49 is the record post 22 previously referred to. At the inner end of the shaft 49 is a so-called main wheel 50 having an edge 51. Because of the functions which it performs, the wheel 50 will also be referred to as a governor disc or brake disc. It will be apparent that the torque exerted by the spring 40, acting through the driving train described above, produces rotation of the main wheel 50 and record post 22, unwinding of the spring being accompanied by retrograde rotation of the winding stem.

For the purpose of governing the speed of the record, which is preferably on the order of 24 r.p.m., the edge 51 of the main wheel 50 is engaged by the spindle 60 of a floating governor assembly 61. Such governor assembly is mounted for swinging movement on an eccentric pivot 62 about which the assembly is biased by a coil spring 63, the assembly being balanced with respect to the pivot 62 by means of a counterweight 61*a*. Because of the eccentric arrangement of the pivot relative to the spindle, it will be apparent that the spindle is urged into snug frictional engagement with the edge of the main wheel 50 and since the latter is directly coupled to the record without any gearing being interposed, the arrangement has almost complete freedom from "wow." For the details of construction of the governor assembly 61, reference is made to copending application Serial No. 499,059, filed April 4, 1955, now Patent No. 2,788,868. It will suffice for present purposes to say that the governor mechanism includes centrifugally controlled brake shoes for limiting the speed of rotation of the spindle 60 to an exactly predetermined value. Included within the governor assembly and directly coupled to the spindle 60 is a toothed impulse wheel 64 used for starting purposes and to which reference will later be made.

Figures 5, 6, 7:
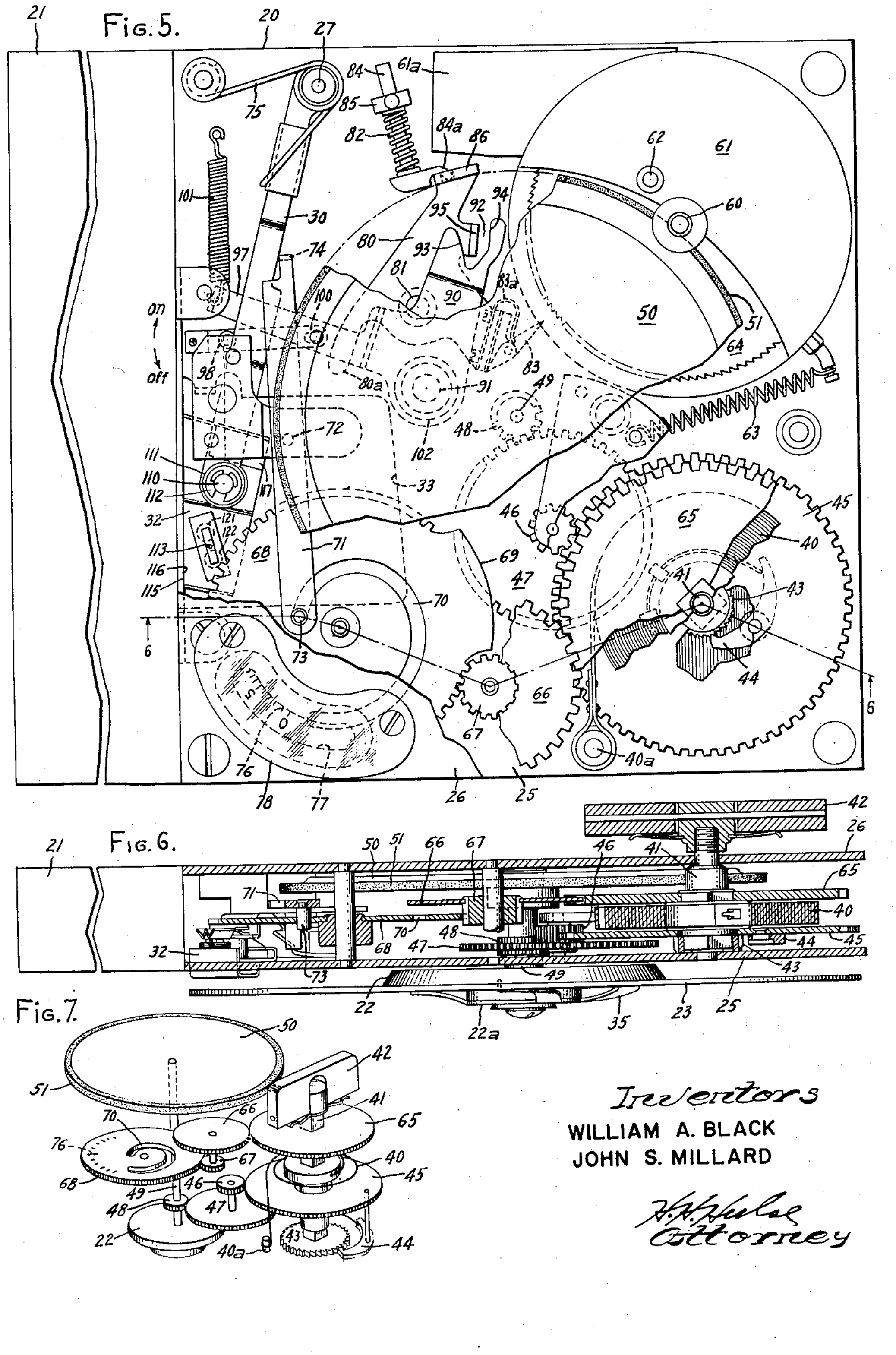
Fig. 5 is a back view of the mechanism shown in Fig. 2 with the casing and portions of the mechanism broken away to reveal the details of construction.
Fig. 6 is a section taken along the line 6—6 in Fig. 5.
Fig. 7 is a simplified and distorted perspective of the record driving train.

In accordance with one of the aspects of the present invention, means directly coupled to the winding key 42 are used for positioning the tone arm 30 relative to the record 23 so that restoring the tone arm to its outer or starting position is accompanied by winding of the spring 40. In the present instance, coupling to the tone arm is accomplished by a gear 65 mounted on the winding stem 41. In mesh with the gear 65 is a second gear 66 having a close coupled pinion 67 which engages the tone arm positioning gear 68. As shown in Fig. 5, the tone arm positioning gear has a blocking portion 69 for the purpose of limiting the range of movement of the tone arm and for preventing overwinding of the spring 40. The body of the gear 68 includes a spiral cam slot 70. Riding in this slot is a tone arm positioning lever 71 having a slot-engaging pin 73 at one end. At the opposite end of the lever 71 is a stop 74 arranged in the path of movement of the tone arm 30, the lever being centrally pivoted at a pivot 72. The tone arm is bottomed against the stop 74 by means of a biasing spring 75 which constantly urges the tone arm 30 in the inwardly swung direction.

For the purpose of indicating the position of the tone arm positioning gear 68 and thus the position of the tone arm, the gear includes indicia in the form of a calibrated scale 76. The latter is viewable through an arcuate opening 77 (Fig. 5) in the rear frame plate, the opening being covered by a suitable transparent window 78 of plastic such as Lucite. In a practical case, the scale 76 may be calibrated in terms of the number of grooves available on the record.

In accordance with the present invention, novel means are provided for overcoming the inertia of the record, governor, and driving train by impulsing the record manually in the forward direction when the record is started. Such impulsing is accomplished by means of an impulse or "kickoff" arm 80 of more or less triangular shape having a central pivot 81 and engaged by an over-center or toggle spring 82, the spring and arm being so arranged that the arm tends to flip into either of two extreme positions from its dead center position. Mounted on the kickoff arm 80 is a kickoff pawl 83 which is arranged to engage the toothed periphery of the impulse wheel 64 with a wiping action, the pawl being held in operating position by a spring 83*a*.

Prior to discussing the action of the pawl 83, further reference will be made to the associated mechanism. With regard to the over-center spring 82, it is telescoped over a plunger 84 (Fig. 5) which is slidably received in a swiveled guide member 85. At its lower end the plunger is provided with a hook 84*a* for pivotally engaging a registering opening in the kickoff arm 80. The kickoff arm furthermore is formed with a brake shoe 86 which consists of a transversely bent tab adjacent the edge of the main wheel 50. Thus, when the kickoff arm 80 is in one of its two extreme positions, i.e., the "off" or braked position, the brake shoe 86 frictionally engages the edge of the main wheel, locking the main wheel and record in position.

In accordance with one of the aspects of the present invention, a manual operator, including a lost motion connection, is provided for the kickoff arm 80, thereby permitting the kickoff arm to flip to its opposite position freely under the influence of the spring 82 accompanied by impulsing of the impulse wheel 64. The operator includes an action lever 90 of generally L-shape pivoted at 91. At one end of the action lever is a V-shaped notch 92 having engaging surfaces 93, 94 loosely straddling a tab or stop member 95 formed on the kickoff lever 80.

Figure 8:
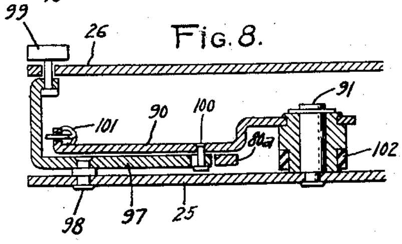
Fig. 8 is a section taken along the line 8—8 in Fig. 10, showing the "on-off" lever.

For the purpose of manually throwing the action lever 90, an "on-off" lever 97 is provided which is pivoted at 98 and which has a conveniently accessible knob 99 extending through a suitable slot formed in the back plate 26 (see Fig. 8). At its opposite end the lever 97 is connected to the action lever 90 by a pin-and-slot pivot connection 100. In order to keep the action lever 90 in the "off" position during periods of non-use a return spring 101 is provided.

Figure 10:
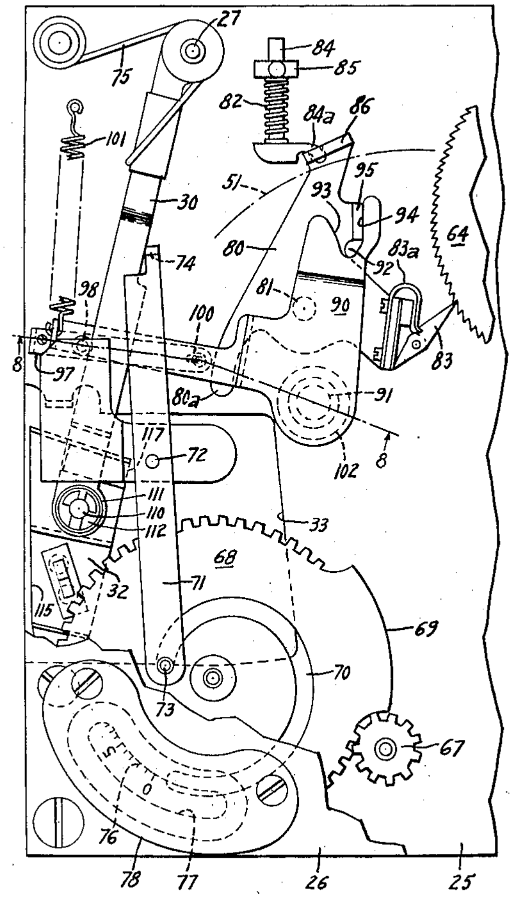
Fig. 10 is a stop motion view showing the mechanism as the "on-off" lever is moved toward the "on" position and at the beginning of the impulse stroke.

To operate the mechanism thus far described, the "on-off" lever 97 is moved toward the "on" position, causing counterclockwise rotation of the action lever 90. After a small amount of lost motion is taken up in the connection 92 (Fig. 5), engagement occurs between the engaging surface 94 on the action lever and the tab 95 on the kickoff lever 80. Upon continued manual movement toward the "on" position, the kickoff lever 80 rotates in a counterclockwise direction. This is accompanied by three effects, as brought out in the stop motion view, Fig. 10. In the first place, the brake shoe 86 is lifted from the edge of the main disc 50, thereby freeing the disc, the governor, and associated record for rotation under the influence of the main drive spring. Simultaneously, the kickoff pawl 83 is brought into engagement with the impulse wheel 64. Third, the over-center spring 82 is compressed and swung around to its illustrated dead center position.

Figure 11:
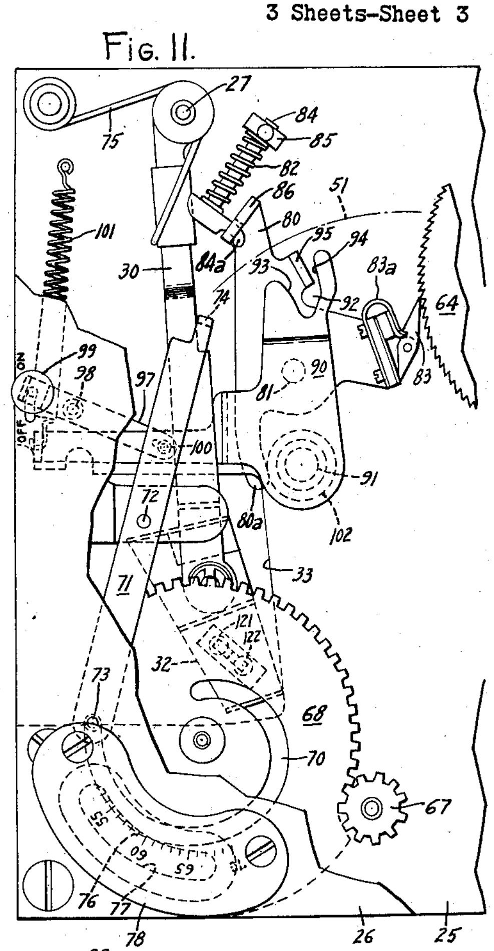
Fig. 11 is a stop motion view similar to Fig. 10 but showing the mechanism at the end of the impulse stroke.

After the spring 82 is swung slightly beyond its dead center position, it "takes over" from the manual control lever so that the continued movement of the kickoff lever is exclusively under the control of the spring 82. The effect of the expansion of the over-center spring is shown in Fig. 11. Here it will be noted that the tab 95 on the kickoff lever 80 swings clear of the engaging surface 94 on the action lever. Simultaneously, the kickoff pawl 83 wipingly applies an impulse stroke to the impulse wheel 64. At the end of the impulse stroke the pawl swings clear and the lever is halted by a stop. Such stop is preferably in the form of a resilient bumper 102 which encircles the pivot 91 (see also Fig. 8) and which is engaged by a projection 80*a* on the lever. Sufficient clearance is provided so that the tab or stop 95 on the kickoff lever does not engage the surface 93 on the action lever; thus the impulse stroke applied to the impulse wheel 64 is entirely unimpeded.

One advantage of the above arrangement is that the impulse applied to the impulse wheel depends upon the energy which is stored in the spring 82 and is independent of the speed with which the manual control lever is moved from its "off" to its "on" position. It will be apparent to one skilled in the art that the characteristics of the over-center spring 82 may be tailored with respect to the friction and inertia of the system so that the impulse wheel is brought up to its normal operating speed as a result of the impulse, at which point the torque from the main driving spring causes continued rotation of the main wheel and associated record. If desired, the over-center spring 82 may be designed to apply a more than adequate impulse, in which case the governor assembly 61 will limit the speed to the desired operating value, the excess of energy being simply absorbed in the brake shoes (not shown) which form a part of the governor assembly.

When manual pressure is released from the operating knob 99 the spring 101, acting through the lever 97, is effective to move the action lever 90 in a clockwise direction. During the course of such movement, engagement takes place between the surfaces 93, 95 at the lost motion connection to retract the yieldable pawl and to cause the over-center spring 82 to be compressed to dead center position. Continued movement of the over-center spring beyond its dead center position causes the brake shoe 86 to be flipped clockwise into resilient engagement with the edge of the main wheel or brake disc 50, thereby stopping further rotation. While the stopping and starting action has been described step by step, it will be understood that each action occurs rapidly and in uninterrupted sequence. It is therefore one of the features of the present device that the record is brought up to recording speed almost instantly, i.e., in a second or less, and stopping takes place even more abruptly when dictation is completed. As a result, all of the record track is usable and intelligible with a smooth final recording, even though no especial care is exercised by the operator.

Having understood the means for driving the record, attention may next be given to the details of construction of the tone arm 30. In accordance with one of the aspects of the present invention, the tone arm 30, which is positively indexed by the tone arm positioning lever 71, includes a transducer head 32 which is frictionally pivoted to the tone arm by a pivot 110 for limited lateral movement (Figs. 4 and 5). Friction is provided by a spring washer 111 and the assembly is held together by a retaining washer 112 or the like. The spring washer 111 exerts sufficient force so that the head 32 normally maintains its orientation relative to the tone arm 30 while permitting the head to move laterally for precise centering of the stylus in a record groove. In the present instance the stylus, indicated at 113, is of the magnetic type and constructed as shown schematically in Fig. 9. Here it will be noted that the stylus 113 forms a magnetic continuation of a magnetic core 120 having windings 121, 122 connected in series with one another. In a practical case the stylus may be approximately ten-thousandths of an inch long and six-thousandths of an inch wide, having a magnetic gap of a half-thousandth of an inch.

For the purpose of establishing a position of nominal alinement of the head relative to the tone arm at the beginning of a record, the head is provided with a straight lateral edge 115 which engages a straight stop member 116 along the edge of the housing. Thus, when the tone arm is moved to its extreme outward position, illustrated in Fig. 5, the head 32 is "flattened" against the stop member 116 so that the stylus is in proper position and orientation to begin recording.

As the recording progresses, the tone arm 30 is allowed to progress inwardly at a controlled rate following the positive stop 74, the rate being coordinated with the spacing of the grooves on the record. However, in the event that the stylus is not alined with the first groove with perfect accuracy or in the event that the grooves on the record are slightly eccentric, relative motion will take place at the pivot 110 so that the stylus is always perfectly centered in the groove in an equilibrium position. Because of the radial spacing between the stylus and the pivot 110, it is found that the friction force may be substantial without any tendency of the stylus to ride out of the record groove. Unwanted pivoting of the head 32 when the stylus is out of contact with the record is minimized by balancing the stylus about the pivot 110, for example, by adding a balancing weight 117.

In accordance with another feature of the present invention, means are provided for camming the tone arm away from the record during periods of non-use. This is accomplished by providing an offset or cam portion **30*a* on the tone arm 30, which offset portion is arranged in the path of movement of the action lever 90. Thus, when the action lever 90 occupies its "off" position (as in Figs. 3 and 5), the lever engages the offset portion 30*a* to retract the pickup head from the record. Conversely, when the action lever 90** is swung downwardly into the "on" position shown in Fig. 4, the action lever is disengaged from the tone arm permitting the tone arm to move the pickup head down into contact with the record. For this purpose, the tone arm is lightly constructed of a leaf of flexible metal.

The pressure exerted by the tone arm under operating conditions may be substantially greater than that used in conventional needle type recorders since the area of the stylus is relatively large and the unit pressure correspondingly low. In a practical case, the pressure exerted against the record may be on the order of 20 to 30 grams, thereby reducing the likelihood that the pickup arm will be dislodged from the groove when the record is subjected to shock. Even in the event that the stylus is dislodged, the positive stop 74, combined with the friction provided at the pivot 110, substantially insures that the stylus will be brought back to the correct groove. The magnetic material used on the face of the record does not per se form a part of the present invention and such material may be of the same type used in magnetic tape.

Figure 9:
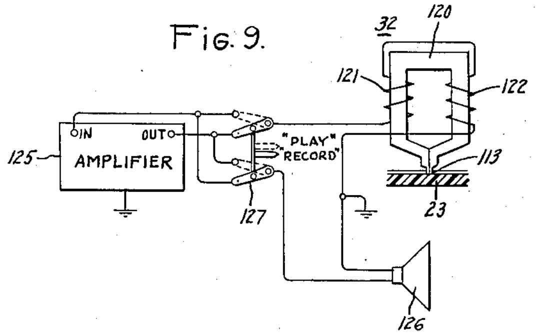
Fig. 9 is a schematic diagram showing the pickup head, speaker-microphone and associated circuit.

With regard to the circuit used in the present device, such circuit may be connected as shown in Fig. 9, including an amplifier 125, a microphone-speaker 126 and a double pole, double throw switch 127. When the switch 127 is in its "record" position, the device 126 is connected as a microphone to the input of the amplifier and the head 32 is connected to the output. When it is desired to play back, the positions of the devices in the circuit are reversed, the head becoming the pickup element and the unit 126 forming a small loudspeaker.

The device described above offers a maximum of operating convenience. Turning the winding key to the limit of its range serves to move the pickup head to its exact outer position while insuring that the spring is fully wound. Moving the manual knob 99 "on" lowers the tone arm into contact with the record while bringing the record up to speed, and recording continues as long as pressure is applied to the manual control. When pressure is released the record instantly stops rotating and the pickup head is retracted. The push-to-talk convenience is equal to that found on large dictating machines. Index 76 gives a constant indication of the groove engaged by the stylus. Thus, when it is desired to play back a predetermined portion of the record the key 42 is turned until the appropriate groove is read on the index 76 after which the switch 127 is switched to the "play" position. Each side of the record accommodates approximately three minutes' dictation, sufficient for a number of letters or a short report. When complete, the record may be mailed in a common business envelop for transcription at a central office. The device is particularly suitable for use by salesmen or others requiring on-the-spot recording of their activities.

We claim as our invention:

1. In a miniature recording device the combination comprising a recording element, a transducer cooperating therewith, means including a source of limited torque for rotating the recording element, a governor closely coupled to the recording element for limiting the speed thereof, a brake for blocking the movement of the recording element, a movable impulse member, said impulse member having an over-center spring for causing the same to be moved between an off position and an on position with a flipping action, means coupled to said impulse member for applying a forward impulse to the recording element incident to the impulse member being flipped to its on position, and a manual operator having a lost motion connection with said impulse member for releasing the brake and for moving said impulse member over-center.

2. In a miniature recording device the combination comprising a recording element, a transducer cooperating therewith, means including a source of limited torque for rotating the recording element, a governor closely coupled to the recording element for limiting the speed thereof to a predetermined value, a pivoted impulse member, said impulse member having an over-center spring for causing the same to move between two limit positions with a flipping action, means on said impulse member for applying a forward wiping impulse to the recording element incident to the impulse member being flipped from one position to the other, and a manual operator having a lost motion connection with said impulse member so that the magnitude of the impulse is determined substantially exclusively by the energy released from said over-center spring.

3. In a miniature recording device the combination comprising a recording element, a transducer cooperating therewith, means including a source of limited torque for rotating the recording element, a governor closely coupled to the recording element for limiting the speed thereof, a pivoted impulse member, said impulse member having an over-center spring for flipping the same between two limit positions, wiping means on said impulse member for applying a wiping impulse to the rotating means incident to the impulse member being flipped from an off position to an on position, a brake shoe on said impulse member for engaging the rotating means when the impulse member is in the off position, and a manual operator coupled to said impulse member by a lost motion connection for moving the impulse member over-center.

4. In a miniature recording device the combination comprising a recording element, a transducer cooperating therewith, means including a source of limited torque for rotating the recording element, a governor closely coupled to the recording element for limiting the speed thereof, a movable impulse member having a brake shoe cooperating with said rotating means for stopping said recording element, said impulse member being movable between an off position in which said brake shoe is in contact with the rotating means and an on position in which the brake shoe is retracted therefrom, means including an over-center spring for flipping the impulse member from one of its positions to the other, means on the impulse member for applying a wiping impulse to the driving means when the impulse member is moved from the off position to the on position, and means for manually moving the impulse member between its two positions.

5. In a miniature recording device the combination comprising a recording element, a transducer cooperating therewith, means including a source of limited torque for rotating the recording element, a disc directly coupled to the recording element, a governor having an impulse wheel coupled to said disc for limiting the speed of the recording element, an impulse member having a brake shoe cooperating with said disc for stopping said recording element, said impulse member being mounted for limited rocking movement between an off position in which said brake shoe is in contact with the rotating means and an on position in which the brake shoe is retracted therefrom, means including an over-center spring for flipping the impulse member from one of its positions to the other, means on the impulse member for applying a wiping impulse to the impulse wheel when the impulse member is moved from the off position to the on position, and means for manually moving the impulse member between its two positions.

6. In a miniature recording device the combination comprising a grooved recording element, means including a source of torque for driving the recording element, a transducer head having a stylus for engaging the groove in said recording element, transport means coupled to said driving means for laterally moving the transducer to keep the same in step with the groove, said transducer head having a pivoted connection with said transport means, and means for creating friction at said pivoted connection so that the stylus is held oriented with said transport means in any position of said device but is free to occupy a precisely centered position with respect to the groove throughout the length of the recording.

7. In a miniature recording device the combination comprising a grooved recording element, means including a source of torque for rotating the recording element, a pivoted tone arm, a transducer head at the end of the tone arm and having a stylus for engaging the groove in said recording element, means directly coupled to said driving means for laterally moving the tone arm from a start position to keep it generally in step with the groove, said transducer head having a pivoted friction connection with said tone arm so that the transducer stylus is free to occupy a precisely centered equilibrium position with respect to the groove, and means including an abutment which is engaged incident to restoring the tone arm to its start position for alining said head in a predetermined position relative to the tone arm.

8. In a miniature recording device the combination comprising a recording element, a transducer cooperating therewith, a record spindle, said record spindle having a governor disc mounted thereon, means including a source of limited torque for rotating the record spindle, a governor having a governor spindle disposed parallel to said record spindle and a mounting pivot eccentrically arranged thereon, means for biasing the governor about said mounting pivot so that the governor spindle is brought into frictional engagement with the edge of the governor disc, said governor having a counterweight for statistically balancing the same about said pivot.

9. In a recording device, the combination comprising, a record disc having a central aperture and a plurality of fingers extending into said aperture so as to define radial slots therebetween, a record post having a mounting plate on which the underside of said disc is placed, a plurality of spring clips secured to said mounting plate and spaced circularly about the axis of said post, said clips having circumferentially extending portions overlying said fingers so as to resiliently hold said disc on said plate, said clip portions being less wide than said slots so that the disc can be rotated and removed from said plate, and a tone arm having a transducer arranged to engage the underside of said disc when the disc is mounted on said plate beneath said clips.

References Cited in the file of this patent

UNITED STATES PATENTS

| | | |
|---|---|---|
| 590,325 | Leslie | Sept. 21, 1897 |
| 619,916 | Williams | Feb. 21, 1899 |
| 948,327 | Hoschke | Feb. 8, 1910 |
| 989,629 | Miller | Apr. 18, 1911 |
| 1,057,344 | Hayward | Mar. 25, 1913 |
| 1,177,887 | Newman | Apr. 4, 1916 |
| 1,337,280 | Sibley | Apr. 20, 1920 |

(Other references on following page)

UNITED STATES PATENTS

| | | |
|---|---|---|
| 1,615,243 | Squibb | Jan. 25, 1927 |
| 2,016,041 | Koopetz | Oct. 1, 1935 |
| 2,078,113 | Zecha | Apr. 20, 1937 |
| 2,205,314 | Staley | June 18, 1940 |
| 2,224,332 | Alsbrook | Dec. 10, 1940 |
| 2,233,242 | Burke | Feb. 25, 1941 |
| 2,293,219 | Rieber | Aug. 18, 1942 |
| 2,302,503 | Proctor | Nov. 17, 1942 |
| 2,309,542 | Rothberg | Jan. 26, 1943 |
| 2,357,033 | Thompson | Aug. 29, 1944 |
| 2,380,037 | Franck | July 10, 1945 |
| 2,455,466 | Brubaker | Dec. 7, 1948 |
| 2,576,250 | Brubaker | Nov. 27, 1951 |
| 2,622,883 | Kurzan | Dec. 23, 1952 |
| 2,626,158 | Lissiansky | Jan. 20, 1953 |

FOREIGN PATENTS

| | | |
|---|---|---|
| 25,457 | Great Britain | of 1909 |